United States Patent [19]

Bujadoux et al.

[11] Patent Number: 4,537,868
[45] Date of Patent: Aug. 27, 1985

[54] CATALYST CONTAINING AN AROMATIC SILICON COMPOUND FOR THE POLYMERIZATION OF ETHYLENE

[75] Inventors: Karel Bujadoux, Lens; Jean-Marie Neyer, Behren Les Forbach, both of France

[73] Assignee: Societe Chimique des Charbonnages S.A., Paris, France

[21] Appl. No.: 594,415

[22] Filed: Mar. 28, 1984

Related U.S. Application Data

[63] Continuation of Ser. No. 326,195, Dec. 1, 1981, abandoned.

[30] Foreign Application Priority Data

Dec. 2, 1980 [FR] France ................................ 80 25519

[51] Int. Cl.³ ........................... C08F 4/64; C08F 4/68; C08F 4/62
[52] U.S. Cl. .................................... 502/104; 502/105; 502/113; 502/117; 502/125; 526/114; 526/115; 526/125; 526/128
[58] Field of Search ............... 502/105, 125, 117, 113, 502/104

[56] References Cited

U.S. PATENT DOCUMENTS

| | | | |
|---|---|---|---|
| 3,135,809 | 6/1964 | Bosmajian | 252/429 A X |
| 3,243,552 | 1/1981 | Welch et al. | 252/429 B |
| 3,440,179 | 4/1969 | Bayer et al. | 252/429 B |
| 3,558,587 | 1/1971 | Bayer et al. | 252/429 B X |
| 3,701,763 | 10/1972 | Wada et al. | 260/88.2 R |
| 3,850,899 | 11/1974 | Wada et al. | 260/88.2 R |

FOREIGN PATENT DOCUMENTS

| | | |
|---|---|---|
| 51-84884 | 7/1976 | Japan. |
| 1411144 | 10/1975 | United Kingdom. |
| 1441115 | 6/1976 | United Kingdom. |
| 1452314 | 10/1976 | United Kingdom. |

*Primary Examiner*—Patrick P. Garvin
*Attorney, Agent, or Firm*—Finnegan, Henderson, Farabow, Garrett & Dunner

[57] ABSTRACT

A catalyst for the polymerization of ethylene comprising at least one halogenated compound of a transition metal of Groups IV to VI of the Periodic System and at least one aromatic silicon compound having the formula $\phi_n Si(OH)_{4-n}$, in which $\phi$ is a substituted or unsubstituted aromatic or polyaromatic ring compound having from 6 to 15 carbon atoms and $1 \leq n \leq 3$, said silicon compound being present in a molar ratio of between 0.2 and 2 inclusive with respect to said transition metal. Polymerization of ethylene may be carried out under a pressure of between 200 to 2500 bars and at a temperature of between 170° and 300° C. with the catalyst of this invention.

12 Claims, No Drawings

CATALYST CONTAINING AN AROMATIC SILICON COMPOUND FOR THE POLYMERIZATION OF ETHYLENE

This application is a continuation of application Ser. No. 326,195, filed Dec. 1, 1981, and now abandoned.

BACKGROUND OF THE INVENTION

The present invention relates to catalysts for the polymerization of ethylene and, more particularly, to Ziegler type catalysts comprising an aromatic silicon compound.

A large number of different Ziegler type catalysts are already known for the polymerization of ethylene and α-olefins. These catalysts generally comprise the catalyst component itself consisting of at least one halogenated compound of a transition metal of Groups IV to VI of the Periodic System, and an activator selected from hydrides and organometallic compounds of the metals of Groups I to III of the Periodic System. The catalyst component comprising the transition metal may be fixed, if desired, on an inert support such as alumina, silica, magnesium oxide, halides of magnesium or manganese, etc.

French Patent Specification No. 2 392 044 describes the polymerization of ethylene, at a temperature of between 0° and 150° C. and under a pressure of from 1 to 50 atmospheres, with a catalyst component obtained by treating $VOCl_3$ successively with triphenyl silanol, so as to form a compound having the formula $(\phi_3 SiO)_n VOCl_3$ (n being 1, 2 or 3), and then with an aluminum alcoholate. Japanese published Patent Application No. 79/70 385 describes the polymerization of propylene with a catalyst component obtained by treating titanium tetrachloride with butyl-magnesium chloride in solution in the presence of an electron donor, such as methyl benzoate, and in the presence of 0.033 molecule of triphenyl silanol per atom of titanium.

On the other hand, it is known to polymerize ethylene under a pressure of between approximately 400 and 2500 bars and at a temperature of between approximately 180° C. and 300° C. Within the scope of such a process, the aim is to improve, on the one hand, the catalytic yield and, on the other hand, the quality of the polymer produced by modifying parameters, in particular: density, molecular weight, molecular weight distribution and formation of the dimer 1-butene.

SUMMARY OF THE INVENTION

The object of the present invention therefore is to provide catalysts that can be used to polymerize ethylene under the conditions of high temperature and high pressure defined above and that are capable of improving the yield and quality of the polymer produced.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve these objects and in accordance with the purpose of this invention, as embodied and broadly described, the catalyst of this invention for the polymerization of ethylene comprise at least one halogenated compound of a transition metal of Groups IV to VI of the Periodic System, said transition metal being in the trivalent state in said compound, and at least one aromatic silicon compound having the formula $\phi_n Si(OH)_{4-n}$, in which $\phi$ is a substituted or unsubstituted aromatic or polyaromatic ring compound having from 6 to 15 carbon atoms and $1 \leq n \leq 3$, said aromatic silicon compound being present in a molar ratio of between 0.2 to 2 with respect to the transition metal of Groups IV to VI. The halogenated compound of the transition metal of Groups IV to VI may be a trihalide of titanium, vanadium, zirconium, chromium or molybdenum and $\phi$ of the aromatic silicon compound may be a phenyl or naphthyl radical, optionally substituted by one or more hydrocarbon radicals on the aromatic ring.

In addition and optionally, the catalysts according to the invention may include aluminium chloride, for example, crystallized together with titanium trichloride in the form of $TiCl_3 \cdot \frac{1}{3} AlCl_3$, and/or a halide of magnesium, maganese or a transition metal of Group VIII such as nickel, iron or cobalt or a mixture of such halides.

According to the invention, the atomic ratio of silicon to the transition metal of Groups IV to VI preferably lies between 0.2 and 2 inclusive.

The behavior of the catalysts of this invention with respect to the polymerization of ethylene are particularly suitable for use in the conditions of elevated pressures and temperatures. It has been observed, in fact, that they increase the yield of polymer produced under such conditions while at the same time increasing its molecular weight and reducing formation of the dimer 1-butene as well as the content of molecular weights below 5,000.

DESCRIPTION OF THE PREFERRED EMBODIMENTS

Reference will now be made in detail to the presently preferred embodiments of the invention.

The catalysts according to the invention can be prepared by at least two different methods. The compound, having the formula $\phi_n Si(OH)_{4-n}$, either can be brought into contact with the halogenated transition metal compound and, possibly, an inert support, either in the dry state or in suspension in a solvent. In the first process for the preparation of the catalysts according to the invention, the halogenated transition metal compound, the compound having the formula $\phi_n Si(OH)_{4-n}$ and, possibly, the inert support, are subjected to a joint milling step, wherein the milling energy lies between 1.5 and 25 kWh per kg of solid material treated. In the second process for the manufacture of the catalysts according to the invention, the halogenated transition metal compound, previously milled together with the inert support if desired, is suspended in an aliphatic, cycloaliphatic or aromatic hydrocarbon solvent and then the aromatic silicon compound, having the formula $\phi_n Si(OH)_{4-n}$, is added to the suspension in the quantity desired in relation to the transition metal within the range defined above. In this process, the temperature of the solvent medium may be raised, when adding the silicon compound, to a temperature slightly below its boiling point.

The present invention also relates to a process for the polymerization of ethylene, under a pressure of between 200 to 2500 bars and at a temperature of between 170° and 300° C., in the presence of a catalyst system comprising (a) at least one halogenated compound of a transition metal of Groups IV to VI of the Periodic System, said transition metal being in the trivalent state in said compound, (b) at least one activator, selected from hydrides and organo-metallic compounds of metals of Groups I to III of the Periodic System, the atomic ratio of the metal in the activator to the transition metal of Groups IV to VI lying between 0.1 and 10, and (c) at least one aromatic silicon compound having the formula $\phi hd\ nSi(OH)_{4-n}$, in which $\phi$ is an aromatic or polyaromatic ring, optionally substituted and having from 6 to 15 carbon atoms, and $1 \leq n \leq 3$. Optionally, the catalyst system also may include aluminium chloride and/or at least one halide of magnesium, manganese or a transition metal of Group VIII of the Periodic System.

The atomic ratio of silicon to the transition metal of Groups IV to VI in the system is between 0.2 and 2 inclusive and the average residence time of the catalyst system in the polymerization reactor is between 2 and 100 seconds. This residence time is chosen as a function of the temperature in the reactor in the sense that the longer it is, the lower is the temperature. This process may be carried out, especially when the polymerization temperature and/or pressure are not very high, in the presence of an inert hydrocarbon, preferably having less than 5 carbon atoms, such as propane or butane.

If an autoclave reactor or tubular reactor having several reaction zones is used in the high pressure process, it can be advantageous in producing some polymer grades, to adopt a particular arrangement for the polymerization unit, as described for example in French Patent Specifications Nos. 2 346 374 and 2 385 745. Frequently, it will be useful in controlling the melt index of the polymer, particularly polyethylene, to carry out the polymerization in the presence of a chain transfer agent, such as hydrogen. In a high pressure process, this agent will be used at the rate of up to 2% by volume with respect to ethylene. In other cases, particularly when it is desired to manufacture an ethylene polymer having a melt index of between 0.1 and 2 dg/mn and a polydisperse index above 10, it will be useful to carry out the polymerization in the complete absence of hydrogen and by adopting a particular arrangement for the unit as shown, for example, in published European Patent Application, No. 0 013 246.

The process according to the present invention, insofar as it relates to the polymerization or the copolymerization of ethylene, enables a whole range of polymers to be produced, the density of which lies between 0.905 and 0.960 g/cm$^3$ and the melt index of which lies between approximately 0.1 and 100 dg/min. Polymers of relatively low density, for example of between 0.905 and 0.935 g/cm$^3$, are obtained by copolymerizing ethylene with an $\alpha$-olefin having from 3 to 8 carbon atoms, e.g., propene at a rate of from 15 to 35% by weight, or 1-butene at a rate of from 15 to 60% by weight. Polymers of medium density, for example of between 0.935 and 0.945 g/cm$^3$, are obtained by copolymerizing ethylene with an $\alpha$-olefin having from 3 to 8 carbon atoms, for example propene at the rate of from 5 to 15% by weight, or 1-butene at the rate of from 8 to 20% by weight.

The process according to the invention makes it possible to improve, on the one hand, the catalytic yield and, on the other hand, the quality of the polymer produced. Other advantages of the invention will become clear on reading the following examples given by way of illustration and without implying any limitation.

EXAMPLE 1 (comparative)

A discontinuous ball-mill is charged with titanium trichloride, crystallized together with aluminium chloride (TiCl$_3\frac{1}{3}$AlCl$_3$), and magnesium chloride in an atomic ratio of Mg/Ti equal to 2. The catalyst obtained is dispersed in methyl cyclohexane and then activated by trioctylaluminium (Activator A) in such an amount that the atomic ratio Al/Ti is equal to 6. Continuous polymerization of ethylene is then carried out in the presence of 1% of hydrogen by volume, under a pressure of 600 bars in an autoclave reactor, having a volume of 0.6 liter and maintained at a temparature of 245° C., by injecting the catalyst dispersion thus prepared in such way that the average residence time of the catalyst in the reactor is equal to about 25 seconds. Table I below gives the catalytic yield $R_c$, expressed in kilograms of polyethylene per milli-atom of titanium, the average number molecular weight $M_n$ and the content B of molecular weights below 5,000 (expressed as a percentage) determined by gel permeation chromatography, as well as the dimerization speed, expressed as the hourly rate of formation of 1-butene.

EXAMPLES 2 and 3

In these examples the activated catalyst obtained in Example 1 is suspended in xylene with triphenyl silanol (Example 2) or in xylene with diphenylsilane diol (Example 3) in an atomic ratio of Si/Ti equal to 1 in both examples for a period of 17 hours and at ambient temperature. The following catalysts are thus obtained; $\phi$ in the formulae denoting a phenyl radical:

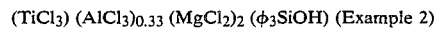
(TiCl$_3$) (AlCl$_3$)$_{0.33}$ (MgCl$_2$)$_2$ ($\phi_3$SiOH) (Example 2)

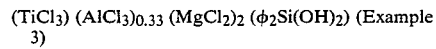
(TiCl$_3$) (AlCl$_3$)$_{0.33}$ (MgCl$_2$)$_2$ ($\phi_2$Si(OH)$_2$) (Example 3)

The catalysts are then used in the same manner as set forth in Example 1 for the continuous polymerization of ethylene and the results are set forth in Table I below.

EXAMPLE 4 (comparative)

In this comparative example, the catalyst used is (TiCl$_3$) (AlCl$_3$)$_{0.33}$. The catalyst is activated and used for the polymerization of ethylene under the same conditions as set forth in Example 1, with the exception of the temperature, which is maintained at 238° C. Table I gives the polymerization yield and the characteristics of the polymer produced.

EXAMPLE 5

An activated catalyst having the formula: (TiCl$_3$) (AlCl$_3$)$_{0.33}$ ($\phi_3$SiOH)$_{0.33}$ is prepared in the same manner as set forth in Example 2 and used for the polymerization of ethylene in the manner described in Example 4. Table I gives the polymerization yield and the characteristics of the polymer produced.

EXAMPLE 6 (comparative)

A discontinuous ball-mill is charged with TiCl$_3$:$\frac{1}{3}$AlCl$_3$ and anhydrous magnesium chloride in an atomic ration of Mg/Ti equal to 6. A milling energy equal to 3.5 kWh per kg of solid material treated is supplied during this preparation step. The catalyst thus obtained is activated by dimethyl-ethyldiethylsiloxalane (Activator B) in such an amount that the atomic ratio of Al/Ti is equal to 6.

Polymerization of ethylene is carried out in the same manner as set forth in Example 1 with the exception of the temperature, which is maintained at 260° C. The results are compiled in Table I below, with the exception of the dimerization speed, which was not measured.

EXAMPLE 7

In this example the ball mill charge of Example 6 is also charged with triphenyl silanol in an atomic ratio of Si/Ti equal to 0.5. The catalyst is then activated and used for the polymerization of ethylene as set forth in Example 6 and the results are compiled in Table I.

EXAMPLE 8 (comparative)

Ethylene is continuously polymerized under a pressure of 1200 bars in a cylindrical autoclave reactor having a volume of 3 liters and divided by means of baffle-plates into three identical zones, maintained respectively at temperatures of 210° C., 185° C. and 260° C. Polymerization is effected in the presence of 0.06% by volume of hydrogen, in order to achieve a polymer having a melt index (measured according to ASTM Standard D-1238 and expressed in dg/min.) equal to 0.35.

The catalyst used, activated by Activator B was that of Example 6. The results are compiled in Table I (the dimerization speed was again not measured).

EXAMPLE 9

The process of Example 8 is repeated but using the catalyst of Example 7, again activated by Activator B and the results are compiled in Table I.

The increase in the density of the polymer, brought about by the catalyst according to the invention, should be noted: 0.958 g/cm$^3$ for Example 9 as against 0.956 g/cm$^3$ for Example 8.

EXAMPLE 10 (comparative)

Ethylene is polymerized in the same reactor and under the same pressure as in Example 8. The three zones are respectively kept at temperatures of 220° C., 240° C. and 260° C. Polymerization is effected in the presence of 0.5% by volume of hydrogen. The catalyst used, activated by Activator B (See Example 6), is that of Example 1.

The results are compiled in Table I below, the density of the polymer formed is 0.950 g/cm$^3$ and the melt index Mi is 0.75.

EXAMPLE 11

The process of Example 10 is repeated except the catalyst used, activated by Activator B (See Example 6), is a compound having the formula (TiCl$_3$)(AlCl$_3$)$_{0.33}$(MgCl$_2$)$_2$($\phi_3$SiOH)$_{0.33}$, prepared in the manner set forth in Example 7.

The results are compiled in Table I. The density of the polymer formed is 0.953 g/cm$^3$ and the melt index is 0.4. Comparing this with Example 10, the influence of the catalyst according to the invention on the density and the melt index is readily apparent.

TABLE I

| Example | R$_c$ | M$_n$ | B % | 1-butene % weight/hour |
|---|---|---|---|---|
| 1 | 6.0 | 12000 | 5.7 | 0.49 |
| 2 | 6.9 | 19000 | 4.3 | 0.05 |
| 3 | 7.2 | 13000 | 5.6 | 0.32 |
| 4 | 2.6 | 11500 | 7.5 | 0.57 |
| 5 | 3.7 | 13000 | 5.9 | 0.22 |
| 6 | 9.4 | 18500 | 4.0 | — |
| 7 | 14.0 | 21000 | 3.3 | — |
| 8 | 9.6 | 38500 | 1.3 | — |
| 9 | 11.7 | 42000 | 1.0 | — |
| 10 | 5.0 | 24000 | 3.8 | 2.0 |
| 11 | 7.7 | 27000 | 3.4 | 0.9 |

It will be apparent to those skilled in the art that various modifications and variations could be made in the catalyst, catalytic system, and process of the invention without departing from the scope or spirit of the invention.

What we claim is:

1. A catalyst for the polymerization or copolymerization of ethylene comprising at least one halogenated compound of a transition metal of Groups IV to VI of the Periodic System, said metal being in the trivalent state in said compound, and at least one aromatic silicon compound having the formula $\phi_n\text{Si(OH)}_{4-n}$, in which $\phi$ is an aromatic or polyaromatic ring compound having from 6 to 15 carbon atoms and $1 \leq n \leq 3$, said aromatic silicon compound being present in a molar ratio of between 0.2 and 2 inclusive with respect to said transition metal, wherein said aromatic or polyaromatic ring compound may have one or more hydrocarbon radicals substituted on the aromatic or polyaromatic rings of said compound.

2. The catalyst of claim 1 in which the transition metal is selected from the group consisting of titanium, vanadium, zirconium, chromium and molybdenum.

3. The catalyst of claim 1 which also includes aluminium chloride.

4. The catalyst of claim 1 which also includes at least one halide of magnesium, manganese or a transition metal of Group VIII of the Periodic System.

5. The catalyst of claim 3, which also includes at least one halide of magnesium, manganese or a transition metal of Group VIII of the Periodic System.

6. The catalyst of claim 1 in which $\phi$ is a phenyl radical.

7. The catalyst of claim 6, in which the aromatic silicon compound is triphenyl silanol.

8. The catalyst of claim 6 in which the aromatic silicon compound is diphenylsilane diol.

9. A process for the manufacture of a catalyst according to claim 1 in which the halogenated transition metal compound, the aromatic silicon compound and an inert support are joint milled, the milling energy lying between 1.5 and 25 kWh per kg of solid material treated.

10. The process of claim 9, in which the catalyst also includes, in the milling step, aluminium chloride.

11. A process for the manufacture of a catalyst according to claim 1 in which the halogenated transition metal compound is suspended in an aliphatic, cycloaliphatic or aromatic hydrocarbon solvent and then the aromatic silicon compound is added to the suspension in the quantity desired in relation to the transition metal.

12. A catalyst system for the polymerization of ethylene, comprising:
 (a) a catalyst of claim 1 and
 (b) at least one activator, selected from hydrides and organometallic compounds of metals of Groups I to III of the Periodic System, the atomic ratio of the metal of the activator to the transition metal of Groups IV to VI lying between 0.1 and 10.

* * * * *